United States Patent
Huang et al.

(10) Patent No.: US 9,568,695 B2
(45) Date of Patent: Feb. 14, 2017

(54) PACKAGE STRUCTURE OF OPTICAL CONNECTOR

(71) Applicant: LuxNet Corporation, Zhongli, Taoyuan County (TW)

(72) Inventors: Yun-Cheng Huang, Zhongli (TW); Chung Hsin Fu, Zhongli (TW); Chi-Min Ting, Zhongli (TW); Nai-Xin Chen, Zhongli (TW)

(73) Assignee: LUXNET CORPORATION, Zhongli, Taoyuan County (TW)

( * ) Notice: Subject to any disclaimer, the term of this patent is extended or adjusted under 35 U.S.C. 154(b) by 333 days.

(21) Appl. No.: 14/057,903

(22) Filed: Oct. 18, 2013

(65) Prior Publication Data

US 2014/0294351 A1   Oct. 2, 2014

(30) Foreign Application Priority Data

Apr. 2, 2013 (TW) ............................ 102206049 U

(51) Int. Cl.
*G02B 6/42* (2006.01)

(52) U.S. Cl.
CPC ............ *G02B 6/4281* (2013.01); *G02B 6/4245* (2013.01); *G02B 6/4249* (2013.01)

(58) Field of Classification Search
CPC .... G02B 6/4245; G02B 6/4249; G02B 6/4281
See application file for complete search history.

(56) References Cited

U.S. PATENT DOCUMENTS

| | | | | |
|---|---|---|---|---|
| 8,057,109 B2 * | 11/2011 | Flens | ........................ | G02B 6/43 385/88 |
| 8,328,435 B2 * | 12/2012 | Teo | ....................... | G02B 6/4201 361/804 |
| 8,466,409 B2 * | 6/2013 | Ishigami | .............. | G02B 6/4292 250/214 R |
| 8,541,736 B2 * | 9/2013 | Baba | .................... | G02B 6/4201 250/239 |
| 8,669,515 B2 * | 3/2014 | Ishigami | .............. | G02B 6/4214 250/214.1 |
| 8,920,048 B2 * | 12/2014 | Togami | ................ | G02B 6/4246 385/88 |

(Continued)

*Primary Examiner* — John M Bedtelyon
(74) *Attorney, Agent, or Firm* — Muncy, Geissler, Olds & Lowe PC

(57) ABSTRACT

The invention provides a package structure of optical connector, comprising: an input circuit board, an output circuit board, a flexible circuit board, an optical transceiver module, and an enclosure for packing the above components. The input/output circuit board comprises a connecting terminal and an input/output terminal comprising a plurality of input/output ports, wherein the input circuit board and the output circuit board are fixed by the two opposite sides of the enclosure to create a specific space between the input circuit board and the output circuit board. The flexible circuit board is electrically connected to the connecting terminal of the input circuit board and/or the connecting terminal of the output circuit board. The optical transceiver module is electrically connected to the input circuit board and the output circuit board. The enclosure comprises an electrical connecting opening and an optical connecting opening corresponding to the electrical connecting opening.

11 Claims, 4 Drawing Sheets

(56) References Cited

U.S. PATENT DOCUMENTS

| | | | |
|---|---|---|---|
| 2011/0228483 A1* | 9/2011 | Togami | G02B 6/4246 361/714 |
| 2012/0207427 A1* | 8/2012 | Ito | G02B 6/4261 385/14 |
| 2013/0077978 A1* | 3/2013 | Duis | H04B 10/14 398/139 |
| 2013/0094864 A1* | 4/2013 | Duis | H04B 10/40 398/139 |

* cited by examiner

PACKAGE STRUCTURE OF OPTICAL CONNECTOR

BACKGROUND OF THE INVENTION

1. Field of the Invention

The present invention relates to a package structure of optical connector. In particular, the present invention relates to a package structure of optical connector which uses a flexible circuit board to connect to an optical transceiver as well as connecting receiving and transmitting signals of the optical transceiver module respectively to two printed circuit boards.

2. Description of the Related Art

Since the processing speed and data capacity of computers keep growing in recent years, the cable wire physical transmission, limited by its bandwidth and transmission speed, is unable to reach the required data capacity nowadays. As a result, the optical fiber communication system was developed. The optical fiber communication system has many advantages, such as no bandwidth limitation, faster transmission speed, longer transmission distance, and electromagnetic-proof constitutive materials. Therefore, the electronics industry has put much effort in developing the optical fiber transmission, which will be the mainstream technology in the future. The so-called optical communication technology uses optical waves as signal media, and transmits signals between two nodes via the optical fibers. In terms of transmission media, the optical communication is divided into an optical signal side and an electrical side. To be more specific, the optical signals are transmitted to an optical transceiver via the optical fiber and transformed into electrical signals. On the contrary, the electrical signals on electrical circuits are transformed into optical signals, which then are transmitted via the optical fiber for the purpose of communication.

As described above, the optical-electrical transformer located at the two nodes of the fibers is the necessary element for optical communication. At present, there are many kinds of optical-electrical transformer standards, such as SATA (Serial Advanced Technology Attachment), SCSI (Small Computer System Interface), etc. Therefore, how to make the interface of the connector for transforming the electrical side and the optical side suitable for the existing connector standards, and how the optical-electrical transforming connector can adapt to the existing equipment has become an important issue for the industry while developing the optical connector. There are many kinds of technology for integrating the optical transceiver module and the connector. The general standard is to form the input circuit and the output circuit on one printed circuit board, and installs an optical transceiver module on the PCB. However, some standards (such as SAS (Serial Attached SCSI) and CXP) are smaller in size, so the input board circuit and the output board circuit are unable to be printed on the same PCB. For accommodating the s all size of those standards, the input circuit and the output circuit are separately printed on two PCBs and make the two PCBs form an up-and-down configuration, wherein connecting the optical transceiver to the two PCBs for reducing the plan size from the upward view. As a result, there remains a need to improve the combination of the package structure of optical connector.

SUMMARY OF THE INVENTION

To solve the foregoing problem, one aspect of the present invention is to provide a package structure of optical connector, comprising: an input circuit board, which comprises a connecting terminal and an input terminal comprising a plurality of input ports; an output circuit board, which comprises a connecting terminal and a input terminal comprising a plurality of output ports; a flexible circuit board, which is electrically connected to the connecting terminal of the input circuit board and/or the connecting terminal of the output circuit board; an optical transceiver module, which is electrically connected to the input circuit board and the output circuit board via the flexible circuit board, and which comprises an optical emitting sub-module and an optical receiving sub-module; and an enclosure for packing the above components, comprising an electrical connecting opening and an optical connecting opening corresponding to the electrical connecting opening, and the input ports and the output ports are corresponding to the electrical connecting opening, while the optical transceiver module is corresponding to the optical connecting opening; wherein the input circuit board and the output circuit board are fixed by the two opposite sides of the enclosure to create a specific space between the input circuit board and the output circuit board.

In the present package structure of optical connector, it is preferable that the said optical transceiver module is mounted on the flexible circuit board and is electrically connected to the input circuit board and the output circuit board via two ends of the flexible circuit board.

In the present package structure of optical connector, it is preferable that the said flexible circuit board comprises a metal base located on a side of the flexible circuit board opposite to the side where the optical transceiver module is mounted, wherein the two lateral sides of the metal base are connected to the enclosure, and the metal base absorbs the electromagnetic interference generated in the enclosure.

In the present package structure of optical connector, it is preferable that the junction between the metal base and the flexible circuit board and/or the two lateral sides of the metal base connected to the enclosure are covered by a heat conductive layer.

In the present package structure of optical connector, it is preferable that the said optical emitting sub-module is an array composed of a plurality of laser diodes, and the optical receiving sub-module is an array composed of a plurality of photo diodes.

In the present package structure of optical connector, it is preferable that the said flexible circuit board comprises a mounting base for supporting the optical transceiver module, wherein the mounting base is located on a side of the flexible circuit board opposite to the side where the optical transceiver module is mounted.

In the present package structure of optical connector, it is preferable that the surface of the mounting base opposite to the flexible circuit board comprises a metal base, wherein the two lateral sides of the metal base are connected to the enclosure, and the metal base absorbs the electromagnetic interference generated in the enclosure.

In the present package structure of optical connector, it is preferable that the junction between the metal base and the mounting base and/or the two lateral sides of the metal base connected to the enclosure are covered by a heat conductive layer.

In the present package structure of optical connector, it is preferable that a first base is in between the flexible circuit board and the connecting terminal of the input circuit board for supporting the flexible circuit board and/or a second base is located in between the flexible circuit board and the connecting terminal of the output circuit board for supporting the flexible circuit board.

In the present package structure of optical connector, it is preferable that the said optical transceiver module is mounted on the output circuit board, and one end of the flexible circuit board is electrically connected to the optical transceiver module while the other end of the flexible circuit board is electrically connected to the input circuit board.

In the present package structure of optical connector, it is preferable that the said optical transceiver module is mounted on the input circuit board, and one end of the flexible circuit board is electrically connected to the optical transceiver module while the other end of the flexible circuit board is electrically connected to the output circuit board.

In the present package structure of optical connector, it is preferable that the said package structure of the optical connector further comprises a mask which is mounted on the optical transceiver module and a plurality of condensing lens are installed on the mask, and the condensing lens correspond respectively to the optical emitting terminal of the optical transceiver module and the optical receiving terminal of the optical transceiver module.

In the present package structure of optical connector, it is preferable that the said input port and output port correspond to the SAS or CXP standard.

Therefore, the present invention attains the following benefits:

1. In the present invention, the optical transceiver module is located in between the input/output circuit boards in parallel and electrically connected to the input/output circuit boards via the flexible circuit board, so the volume of the package structure has decreased and become suitable for the demand for compact size of the SAS, CXP standard.

2. In the package structure of optical connector, the first base, the second base, and the mounting base are installed on the flexible circuit board, and the bent sector at the gap of those bases can keep the flexibility and raise the strength of the flexible circuit board to prevent those circuit boards from warping or deforming.

3. The metal base and the enclosure are connected, and the junction between the metal base and the enclosure is covered by the heat conductive layer for guiding the heat generated from the circuit to the outside of the enclosure through the metal base. In additional, the metal base of the present invention can absorb the electromagnetic inference which is generated in the enclosure.

BRIEF DESCRIPTION OF THE DRAWINGS

The invention is described in detail below with reference to the appended drawings, wherein numerals alike designate similar parts.

DETAILED DESCRIPTION OF THE PREFERRED EMBODIMENTS

In the following detailed description, for the purpose of explanation, numerous specific details are set forth in order to provide a thorough understanding of the disclosed embodiments. As those skilled in the art would recognize, modifications within the spirit and scope of the invention will be readily apparent to those of skill in the art. In addition, it should be understood that aspects of the invention and portions of various embodiments and various features stated below and/or in the appended claims may be combined or interchanged either in whole or in part. Furthermore, those of ordinary skill in the art will appreciate that the following description is only exemplary, and is not intended to limit the invention.

In addition, the scale of the figures may not be drawn in its actual proportion but may be exaggerated for the convenience of illustration. The figures and its scale are not restrictive to the present invention.

Figure 1:
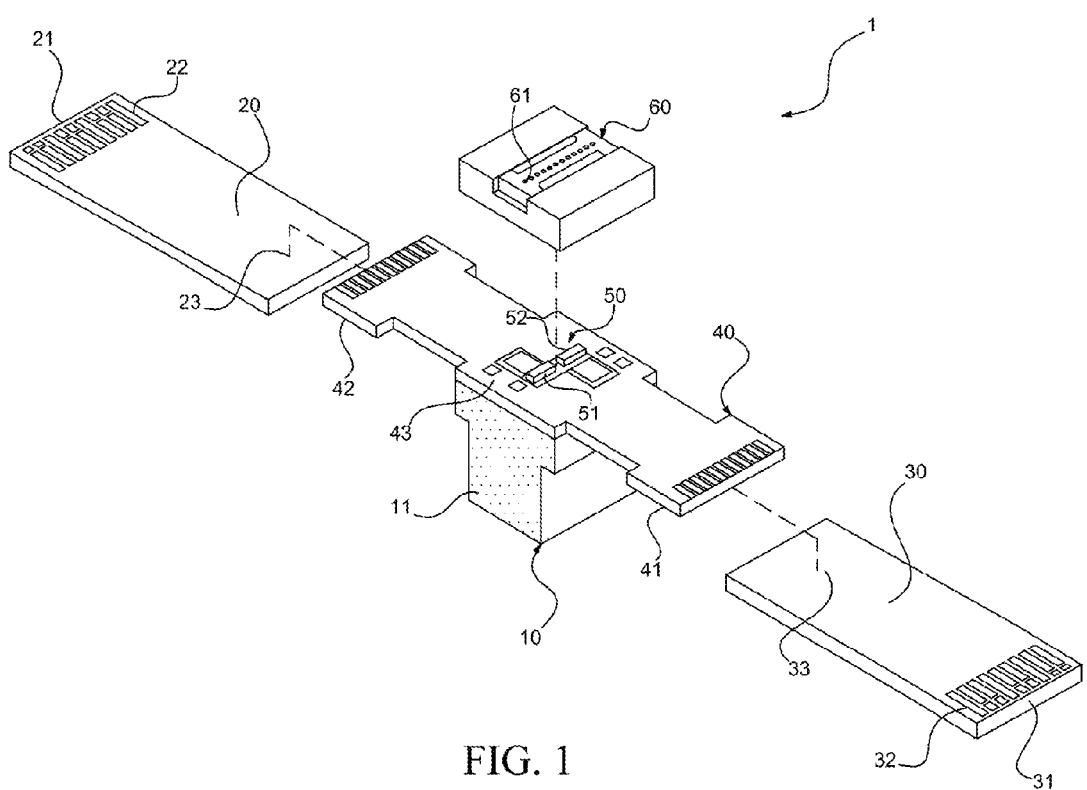
FIG. 1 is a decomposition schematic diagram in three dimensions that shows the internal components of the package structure of optical connector of the first exemplary embodiment.

Regarding the present invention, please refer to FIG. 1, which is a decomposition schematic diagram in three dimensions that shows the internal components of the package structure of optical connector of the first exemplary embodiment. As shown, the present invention provides a package structure of optical connector 1. For instance, an optical transceiver module connected to a flexible circuit board is illustrated, and the package structure of optical connector 1 is suitable for SAS, CXP connector standard. The package structure of optical connector 1 is used for transforming the optical signals from the optical fiber into electrical signals and transmitting the electrical signals to the output circuit board, or transforming the electrical signals from the input circuit board into optical signals and transmitting the optical signals to the optical fibers. Therefore, the package structure of optical connector 1 executes the transformation between electrical signals and optical signals and is suitable for established connector standards such as SAS or CXP.

The term "input" and "output" used herein refers to the input/output of the package structure of optical transceiver 1, namely, the signal from outside that is transmitted to the package structure of optical transceiver 1 is called "input", and the signal from the package structure of optical transceiver 1 transmitted to outside is called "output".

The package structure of optical transceiver 1 comprises an input circuit board 20 and an output circuit board 30 configured into an upper-and-lower layout with a specific space in the middle, a flexible circuit board 40 which is electrically connected to the input circuit board 20 and the output circuit board 30 separately, and an optical transceiver module 50 which is mounted on the flexible circuit board 40. The input circuit board 20 and output circuit board 30 are PCBs (Printed circuit board). The input circuit board 20 comprises an input terminal 21 which comprises a plurality of input ports 22, and a connecting terminal 23. The input ports 22 are used for transmitting the electrical signals from external circuits (such as external device or machines) to the optical transceiver module 50. Correspondingly, the output circuit board 30 comprises an output terminal 31 which comprises a plurality of output ports 32, and a connecting terminal 33. The output ports 32 are used for transmitting the electrical signals which are transferred by the optical transceiver module 50 to external circuits (such as external device or machines). The pins of the input/output ports 22/32 and the geometrical attributes of the input/output terminals 21/31 are designed for specific demands. For example the package structure of optical connector 1 can be designed for the SAS, CXP connector standards or other optical fiber connector standards.

Since high frequency signals may lose some power at corners or bent parts when transmitted in a conductive path, the present inv on chooses the flexible circuit board 40 as the bus wire to connect the optical transceiver module 50 and the circuit. The flexible circuit board 40 is a FPC (Flexible printed circuit board) with many layers inside for shielding electromagnetic fields to improve the integrity of signals in transmission, especially at corners or bent parts, wherein the flexible circuit board 40 connects the emitting/receiving circuits of the optical transceiver module 50 to different PCBs, such as the input circuit board 20 and the output circuit board 30.

The flexible circuit board 40 comprises a first terminal 41 connected and conducted to the input circuit board 20, a second terminal 42 connected and conducted to the output circuit board 30, and a mounting sector 43 located in between the first terminal 41 and the second terminal 42, leaned against a metal base 10. With its flexibility and flatness, the flexible circuit board 40 that can be flatly fixed on the edge of the base 10, the input circuit board 20, and the output circuit board 30. In the manufacturing process, the flexible circuit board 40 can directly electrically connect to the input circuit board 20 and the output circuit board 30 without the welding process.

Figure 2:
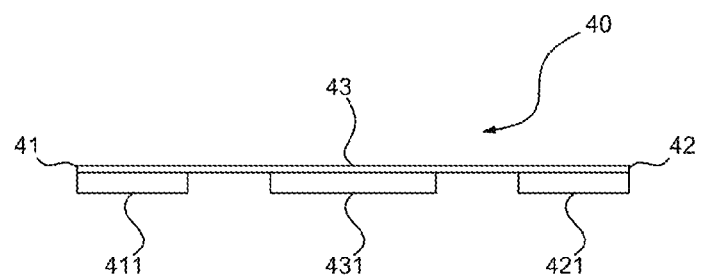
FIG. 2 is a side view plane diagram that shows the connecting bases of the flexible circuit board of the first exemplary embodiment.
Figure 3:
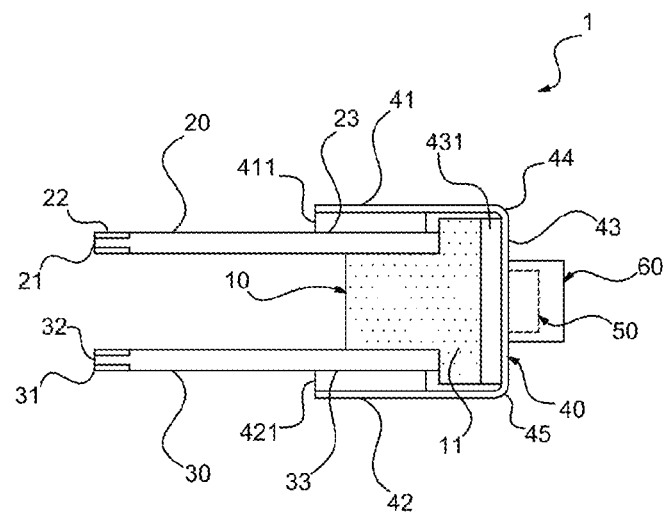
FIG. 3 is a plane diagram that shows the first exemplary embodiment of the present invention.

Additionally, to prevent stress imbalance or external impact causing the flexible circuit board 40 to be warped or deformed, it is preferred to connect a base to raise the strength of the flexible circuit board 40. Please refer to FIG. 2, a side view plane diagram that shows the connecting bases of the flexible circuit board, and also FIG. 3, a plane diagram that that shows the first exemplary embodiment of the present invention. As shown, the flexible circuit board 40 comprises a first base 411 which is connected to the first terminal 41, a second base 421 which is connected to the second terminal 42, and a mounting base 431 which is connected to the mounting sector 43. The mentioned base is composed of metal, and the flexible circuit board 40 further comprises a first bent 44 between the first base 411 and the mounting base 431, a second bent 45 between the second base 421 and the mounting base 431. Because the first base 411 is connected to the input board 20, the second base 421 is connected to the input board 30, and the mounting base 431 is connected to the metal base 10, the flexible circuit board 40 can be fixed on the package structure of the optical connector 1 while keeping its flexibility. In the other embodiment, the flexible circuit board 40 only comprises the mounting sector 43 which connects to the mounting base 431, and directly connects the first sector 41 and the second sector 42 to the input circuit board 20 and the output circuit board 30 for the transmission of signals.

In the above preferred embodiment, the metal base 10 is located at the side of the flexible circuit board 40 opposite to the side where the optical transceiver module 50 is mounted. The metal base 10 is covered by a heat conductive layer 11. The heat conductive layer 11 can be located at two opposite sides of the flexible circuit board 40 and/or the junction of the metal base 10 and the flexible circuit board 40/mounting base 431. The heat conductive layer 11 is a thin layer composed of thermal grease, heat conduction glue, heat conduction adhesive or other kind of heat conductive material that sticks on the heating surface to enhance the heat conductibility. As shown in FIG. 1, the metal base 10 has two slots for placing the input circuit board 20 and the output circuit board 30, and the metal base 10 supports the optical transceiver module 50. The metal base 10 can also separate the input circuit board 20 and the output circuit board 30 into an upper layer and a lower layer. However, the primary purpose of the present invention is to dissipate heat and separate the input circuit board 20 and the output circuit board 30, so the geometric shape of the metal base 10 is not limited.

The optical transceiver module 50 is placed over the mounting sector 43 (the flexible circuit board 40 in the middle), and the optical transceiver module 50 comprises an optical emitting sub-module 51 which is coupled to the input ports 22 via the first terminal 41, and an optical receiving sub-module 52 which is coupled to the output ports 32 via the first terminal 42. Specifically, the optical emitting module 51 is an array composed of a plurality of laser diodes, and the optical receiving module 52 is an array composed of a plurality of photo diodes. The number of the laser diodes and the photo diodes is corresponding to the number of fibers, and this number is not limited in the present invention. The transmission direction of the fiber and the optical emitting sub-module 51/the optical receiving sub-module 52 is parallel to the direction of the connecting terminal 23/33 toward the input/output ports 22/32 of the input/output circuit board 20/30. In another embodiment, to centralize the optical streams of the optical communication, the package structure of the optical connector 1 further comprises a mask 60 which is installed on the optical transceiver module 50, and a plurality of condensing lens 61 located on the mask 60, wherein the condensing lens 61 are positionally corresponding to the optical emitting terminal of the optical emitting sub-module 51 and the optical receiving terminal of the optical receiving sub-module 52 to improve the efficiency of optical transmission. The term "optical emitting terminal" used herein refers to the position where the lights carrying signal is emitted to the fibers, and the term "optical receiving terminal" used herein refers to the position where the lights carrying signal enters the fibers.

Figure 4:
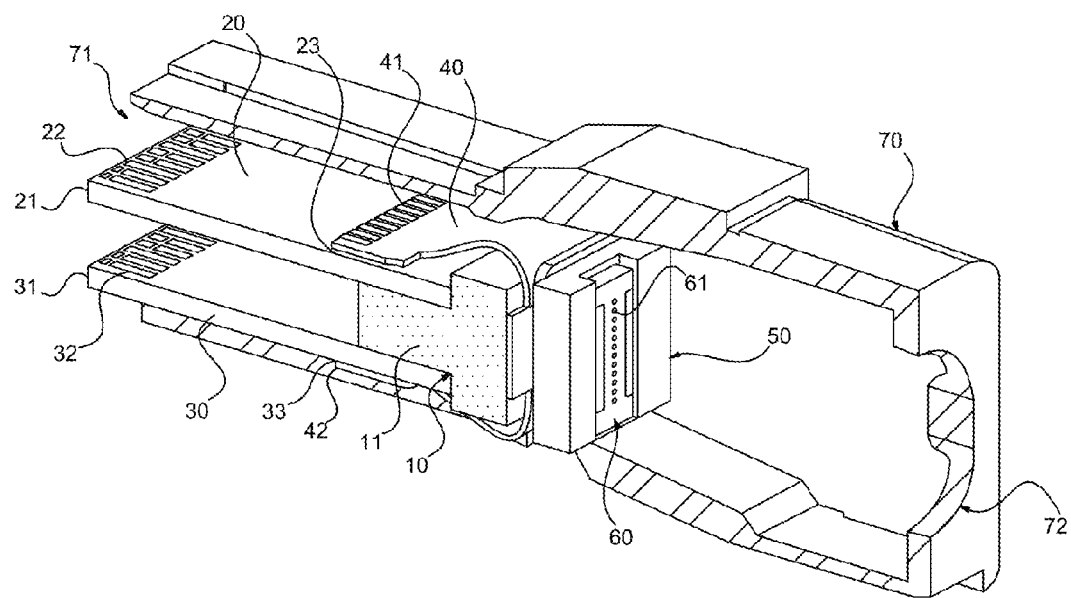
FIG. 4 is a schematic diagram that shows the application of the first exemplary embodiment of the present invention.

For a clear understanding of the features of the present invention, an application example of the package structure of the optical connector 1 is illustrated below. The example is only meant to explain the technical details of the present invention and does not limit the range of the claim. Please refer FIG. 4, a schematic diagram that shows the application of the first exemplary embodiment of the present invention. As shown, the package structure of optical connector 1 of the present invention is assembled in an enclosure 70. To make the representation understandable, FIG. 4 has only drawn the sectional view of the enclosure 70 to show the assembling of the components of the package structure of the optical connector 1. The enclosure 70 comprises an electrical connecting opening 71, and an optical connecting opening 72 positionally corresponding to the electrical connecting opening 71. The input circuit board 20 and the output circuit board 30 are fixed by the two opposite sides of the enclosure 70 to create a specific space between the input circuit board 20 and the output circuit board 30. The input ports 22 of the input circuit board 20 and the output ports 32 of the output circuit board 30 are exposed to the enclosure 70 toward the electrical connecting opening 71. In this exemplary embodiment, the heat conductive layer 11 on the metal base 10 contacts the enclosure 70 for conducting and spreading heat generated from the optical transceiver module 50. On the other hand, the metal base 10 can absorb the electromagnetic inference generated during the communication and transform the electromagnetic inferences into currents which are later dissipated. The input ports 22 of the input circuit board 20 and the output ports 32 of the output circuit board 30 can be used as connection heads for connecting to other circuits of external equipment. The optical connecting opening 72 provides a place for setting the fibers for transmitting and receiving signals through the optical transceiver module 50 and the mask 60. Because the fibers are usually ordered in row, the mask 60 is shaped into a narrow rectangle to adapt to the fibers, and the mask 60 is placed horizontally or vertically to the input circuit board 20 and the output circuit board 30, wherein direction of placement depends on the configuration of the fibers.

Figure 5:
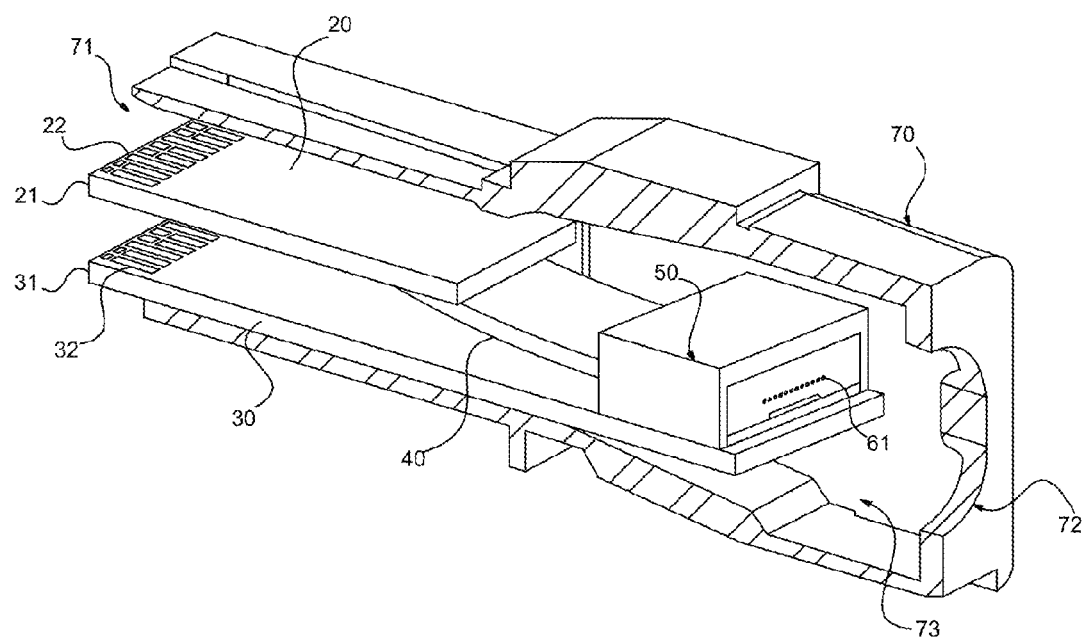
FIG. 5 is a schematic diagram in three dimensions that shows the second exemplary embodiment.

Please refer to FIG. 5, a schematic diagram in three dimensions that shows the second exemplary embodiment. As shown, this exemplary embodiment uses the COB (chip on board). The COB means that the optical transceiver module 50 is directly placed on the input/output circuit board 20/30 and thus the occupied volume becomes smaller. Because this exemplary embodiment is different from the first exemplary embodiment only in the way of connecting between components, for the illustration of the components, please refer to the description of the input circuit board 20, the output circuit board 30, and the optical transceiver module 50 in the first exemplary embodiment. What follows only illustrates the differences between these two exemplary embodiments.

In FIG. 5, the package structure of optical connector 1 comprises an enclosure 70. The enclosure 70 comprises a housing space 73, and the input circuit board 20 and the output circuit board 30 are located at the two opposite sides of the housing space 73. The enclosure 70 forms two grooves corresponding to the input circuit board 20 and the output circuit board 30, or a bump at the middle of those circuit boards. In this way, the input circuit board 20 and the output circuit board 30 can be separated with a space. The optical transceiver module 50 is located on the output circuit board 30 and directly makes the optical receiving sub-module 52 of optical transceiver module 50 electrically connected to the output circuit board 30, while the input circuit board 20 is electrically connected to the optical emitting sub-module 51 via the flexible circuit board 40. In contrast, if the optical transceiver module 50 is located on the input circuit board 20 and makes the optical emitting sub-module 51 of the optical transceiver module 50 directly electrically connected to the output circuit board 30, the output circuit board 30 will be electrically connected to the optical receiving sub-module 52 of the optical transceiver module 50 via the flexible circuit board 40. Thus, the optical transceiver module 50 can be selectively located at the input circuit board 20 or the output circuit board 30, and whichever the choice, the optical transceiver module 50 will be electrically connected to another circuit board via the flexible circuit board 40 to attain the full capacity of the package structure of optical connector 1 and adapt to the existing connector standards while reducing the volume.

To conclude from above, the package structure of optical connector of the present invention uses the flexible circuit board to connect the input circuit board and the output circuit board to transform optical signals into electrical signals or electrical signals into optical signals via the optical transceiver module. The flexible circuit board can be flatly fixed on the bases and the input and output circuit boards to reduce the volume of product and improve the design of the product to conform to the requirement of compactness of the standards. The first base, the second base, and the mounting base are connected to the flexible circuit board to enhance its strength and help prevent the flexible circuit board from being warped or deformed by external forces. The metal base is connected to the enclosure, and the junction between the metal base and the enclosure is covered by the heat conducting layer for conducting and spreading the heat through the enclosure. On the other hand, the metal base of the present invention has the ability to absorb electromagnetic inferences. Additionally, the present invention can coordinate to different kinds of circuit designs, such as SAS, CXP or other optical connector standards.

While the present invention has been described in connection with certain exemplary embodiments, it is to be understood that the invention is not limited to the disclosed embodiments, but, on the contrary, intended to cover various modifications and equivalent arrangements included within the spirit and scope of the appended claim, and the equivalent thereof.

What is claimed is:

1. A package structure of optical connector, comprising:
   an input circuit board, which comprises a connecting terminal and an input terminal comprising a plurality of input ports;
   an output circuit board, which comprises a connecting terminal and a input terminal comprising a plurality of output ports;
   a flexible circuit board, which is electrically connected to the connecting terminal of the input circuit board and/or the connecting terminal of the output circuit board;
   an optical transceiver module, which is electrically connected to the input circuit board and the output circuit board via the flexible circuit board, and which comprises an optical emitting sub-module and an optical receiving sub-module, the optical transceiver module is mounted on the flexible circuit board and is electrically connected to the input circuit board and the output circuit board via the two ends of the flexible circuit board;
   a metal base, locates on a side of the flexible circuit board opposite to the side where the optical transceiver module is mounted, wherein the two lateral sides of the metal base are connected to an enclosure, and the metal base absorbs the electromagnetic interferences generated in the enclosure, the metal base is formed as a T-shape and has two slots for placing the input circuit board and the output circuit board, to separate the input circuit board and the output circuit board by a distance; and
   the enclosure for packing the above components, comprising an electrical connecting opening and an optical connecting opening corresponding to the electrical connecting opening, and the input ports and the output ports are corresponding to the electrical connecting opening, while the optical transceiver module is corresponding to the optical connecting opening;
   wherein the input circuit board and the output circuit board are fixed by the two opposite sides of the enclosure to create a specific space between the input circuit board and the output circuit board.

2. The package structure of optical connector of claim 1, wherein the junction between the metal base and the flexible circuit board and/or the two lateral sides of the metal base connected to the enclosure are covered by a heat conductive layer.

3. The package structure of optical connector of claim 1, wherein the optical emitting sub-module is an array composed of a plurality of laser diodes, and the optical receiving sub-module is an array composed of a plurality of photo diodes.

4. The package structure of optical connector of claim 1, wherein the flexible circuit board comprises a mounting base for supporting the optical transceiver module, wherein the mounting base is located on a side of the flexible circuit board opposite to the side where the optical transceiver module is mounted.

5. The package structure of optical connector of claim 4, wherein the surface of the mounting base opposite to the flexible circuit board comprises a metal base.

6. The package structure of optical connector of claim 5, wherein the junction between the metal base and the mounting base and/or the two lateral sides of the metal base connected to the enclosure are covered by a heat conductive layer.

7. The package structure of optical connector of claim 1, wherein a first base is located in between the flexible circuit board and the connecting terminal of the input circuit board for supporting the flexible circuit board and/or a second base is located in between the flexible circuit board and the connecting terminal of the output circuit board for supporting the flexible circuit board.

8. The package structure of optical connector of claim 1, which further comprises a mask which is mounted on the optical transceiver module, and a plurality of condensing lens are installed on the mask, and the condensing lens correspond respectively to the optical emitting terminal of the optical transceiver module and the optical receiving terminal of the optical transceiver module.

9. The package structure of optical connector of claim 1, wherein the input ports and the output ports correspond to the SAS or CXP standard.

10. A package structure of optical connector, comprising:
an input circuit board, which comprises a connecting terminal and an input terminal comprising a plurality of input ports;
an output circuit board, which comprises a connecting terminal and a input terminal comprising a plurality of output ports;
a flexible circuit board, which is electrically connected to the connecting terminal of the input circuit board;
an optical transceiver module, which is electrically connected to the input circuit board via the flexible circuit board, and which comprises an optical emitting sub-module and an optical receiving sub-module, the optical transceiver module is directly mounted on the output circuit board, and one end of the flexible circuit board is electrically connected to the optical transceiver module while the other end of the flexible circuit board is electrically connected to the input circuit board; and
an enclosure for packing the above components, comprising an electrical connecting opening and an optical connecting opening corresponding to the electrical connecting opening, and the input ports and the output ports are corresponding to the electrical connecting opening, while the optical transceiver module is corresponding to the optical connecting opening;
wherein the input circuit board and the output circuit board are fixed by the two opposite sides of the enclosure to create a specific space between the input circuit board and the output circuit board.

11. A package structure of optical connector, comprising:
an input circuit board, which comprises a connecting terminal and an input terminal comprising a plurality of input ports;
an output circuit board, which comprises a connecting terminal and a input terminal comprising a plurality of output ports;
a flexible circuit board, which is electrically connected to the connecting terminal of the output circuit board;
an optical transceiver module, which is electrically connected to the output circuit board via the flexible circuit board, and which comprises an optical emitting sub-module and an optical receiving sub-module, the optical transceiver module is directly mounted on the input circuit board, and one end of the flexible circuit board is electrically connected to the optical transceiver module while the other end of the flexible circuit board is electrically connected to the output circuit board; and
an enclosure for packing the above components, comprising an electrical connecting opening and an optical connecting opening corresponding to the electrical connecting opening, and the input ports and the output ports are corresponding to the electrical connecting opening, while the optical transceiver module is corresponding to the optical connecting opening;
wherein the input circuit board and the output circuit board are fixed by the two opposite sides of the enclosure to create a specific space between the input circuit board and the output circuit board.

* * * * *